March 22, 1938.    F. C. HOLTZ    2,111,629
JEWEL BEARING FOR ELECTRIC METERS, AND THE LIKE
Filed May 8, 1936
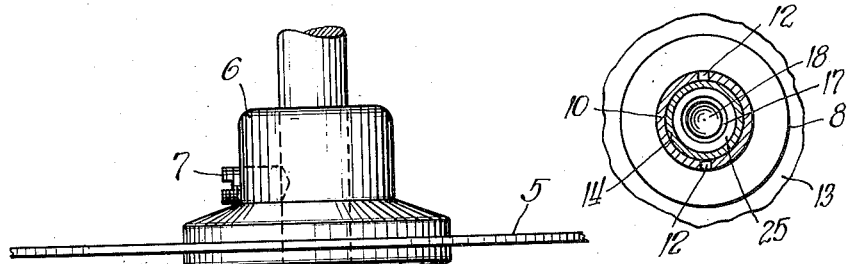
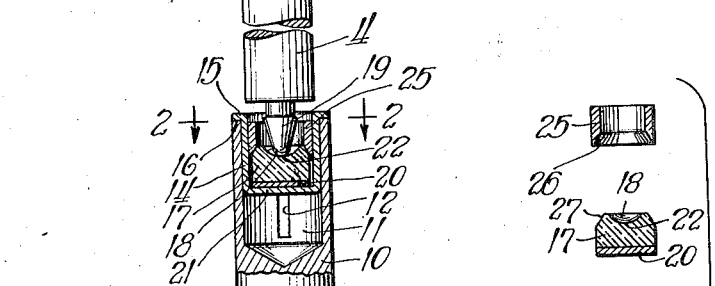
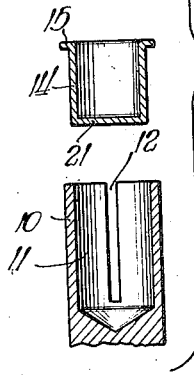
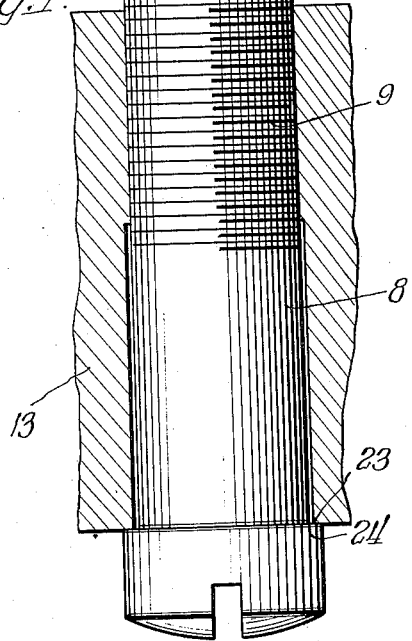
Inventor:
Frederick C. Holtz
By Brown, Jackson, Boettcher & Dienner
Attys Patented Mar. 22, 1938

2,111,629

UNITED STATES PATENT OFFICE 2,111,629

JEWEL BEARING FOR ELECTRIC METERS AND THE LIKE

Frederick C. Holtz, Springfield, Ill., assignor to Sangamo Electric Company, Springfield, Ill., a corporation of Illinois Application May 8, 1936, Serial No. 78,665

6 Claims. (Cl. 308—159)

This invention relates generally to bearings, and is more particularly concerned with bearings of the type employed for supporting the moving system, i. e., the spindle, the aluminum meter disc and the worm carried by the spindle, of integrating meters and other like instruments of precision.

It is extremely important in instruments of the type above described that error, due to friction between the spindle and its supporting bearing, be minimized as much as possible. To this end, the supporting bearings for instruments of this type have in general comprised a cup-jewel forming a seat for the lower end of the spindle, the jewel being carried on the upper end of a mounting screw, which screw in turn is carried by a stationary portion of the instrument. These jewels, however, are subject to deterioration through numerous factors which require their replacement from time to time in order to insure satisfactory operation of the instrument. For example, the bearing assembly carries substantially the entire weight of the moving system, and the major load imposed on the bearing is in the nature of a vertical thrust load of the weight of the moving system. While the weight of the moving system is comparatively small, nevertheless in any severe jar or shock to the instrument, the inertia of the moving system may be sufficient to crack, scratch, or in some other way mar the rather delicate bearing surface of the jewel, particularly when the inertia is acting downwardly in a substantially straight line. Furthermore, vibration or any unusual radial loads imposed upon the moving system is apt to cause rubbing of the spindle on the jewel and, even under ordinary conditions of use, the wear on the jewels is of such proportions that readjustment of the bearing and new jewels may be necessary from time to time to preserve satisfactory operation.

Broadly, the present invention has for its principal object the provision of a new and improved construction of means for securing the bearing element in the mounting screw, which means, together with the bearing element, may readily be removed or replaced. Such construction of bearing assembly is advantageous in that if the bearing surface of the assembly becomes cracked, worn or scratched, it is only necessary to replace the bearing element and its securing means and not to discard the entire bearing assembly. There is thus a definite saving in maintenance cost with the bearing of the present invention.

More specifically, the invention consists in certain novel combinations and arrangements of parts, as will hereinafter be more fully set forth and claimed.

In describing the invention, reference is had to the accompanying drawing, wherein I have illustrated the preferred physical embodiment of the invention, and in which:

Figure 1 is an enlarged front elevational view, partly in section, of a bearing assembly embodying the principles of the present invention;

Figure 2 is a view taken substantially along the line 2—2 of Figure 1;

Figure 3 is an exploded view, in vertical section, of the component parts of the bearing assembly.

Referring now in detail to the drawing, I have shown only so much of the moving system of an integrating meter, comprising the spindle 4 and the aluminum meter disc 5 rigidly secured to the spindle 4 by means of hub 6 and the set screw 7, as is necessary to an understanding of the invention.

The new and improved bearing assembly of the present invention comprises a bearing screw 8 formed of any suitable or preferred metal, and externally threaded as indicated at 9 to cooperate with internal threads formed on some stationary portion of a meter such, for example, as the frame or meter housing 13. At its upper end, the screw is preferably reduced in diameter to form a jewel receiving or housing portion 10 for the reception of the bearing jewel and its cooperating elements. Portion 10 is prepared to receive the bearing jewel by drilling or reaming down from the upper end thereof to form a bore 11 of relatively large diameter. Housing 10 is then provided at diametrically opposite points with slots 12, which extend for substantially the full length of the housing.

Bore 11 is adapted to receive a jewel supporting member in the form of a cup 14, which may also be formed of any suitable or preferred metal. Cup 14 is relatively deep and, at its upper marginal edge, is provided with an annular outwardly extending flange 15. When the cup is inserted into bore 11, this flange is adapted to seat on the peripheral edge 16 of housing 10 and to limit the insertion of the cup into the bore. Preferably, the diameter of cup 14 is slightly greater than the diameter of bore 11, to permit of inserting the cup into bore 11 under pressure. The slots 12 in housing 10 permit the walls of the housing to be slightly forced apart to receive the cup, and the cup, in effect, is thereby held in bore 11 under spring pressure. Cup 14 is for the purpose of supporting the bearing jewel 17 within bore 11.

Jewel 17 is preferably a sapphire jewel of the type commonly employed in these bearing assemblies, being provided with a spherical cup or recess 18 for rotatably supporting the pivot 19 of spindle 4. The jewel is disposed in the bottom of cup 14 and seats on a washer 20, which washer, in turn, seats on bottom wall 21 of the cup. Bottom wall 21 provides a flat, accurate seat for the jewel and washer and thereby provides for stable mounting of the jewel.

Washer 20 may be formed of paper, or any other suitable material, and is preferably cemented to the under surface of jewel 17. This washer has several distinct advantages. It is formed of a certain definite thickness to maintain a certain definite dimension between bottom 22 of the spherical cup or recess 18 and the shoulder 23 formed by head 24 of screw 8. Variations arising in the distance between the bottom of jewel cavity 18 and the bottom surface of the jewel, or any variation in the height of the cup 14, are readily compensated for by these washers. Thus by employing washers of different calibrated thicknesses, closer tolerances may be obtained between the bottom of spherical cup 18 and shoulder 23 of screw 8. In addition, washer 20 acts as a pad or cushion between jewel 17 and bottom wall 21 of cup 14, thereby providing a yieldable mounting for the jewel and distributing any pressure which may be imposed on the lower face of the jewel more uniformly around its entire circumference.

Jewel 17, when seated in cup 14, has its upper surface disposed an appreciable distance below the upper marginal edge of the cup. The portion of the cup disposed above jewel 17 is adapted to receive a jewel retaining member, indicated at 25. Jewel retaining member 25 may be formed of any suitable or preferred metal, and is preferably in the form of a ring or sleeve. The external diameter of ring member 25 is slightly greater than the internal diameter of cup 14 so that the ring may be inserted into cup 14 under pressure, and be frictionally held therein, while the height of the ring is such that when the lower surface of the ring is in contact with the jewel, the upper peripheral edge of the ring will be disposed immediately below the upper peripheral edge of the cup. At its lower edge, ring 25 is chamfered off to provide a conical surface 26, preferably at an angle of approximately 60 degrees with the horizontal, which surface is adapted for engagement with a matching conical surface 27 formed on the upper peripheral edge of jewel 17. When jewel 17 is seated in cup 14 and ring 25 is inserted into the cup, the engagement between the conical surfaces 26 and 27 automatically centers the jewel with respect to the vertical axis of cup 14.

Jewel 17, washer 20 and cup 14, are preferably assembled as a unit and then inserted into bore 11 of housing 10. It will be noted that slots 12 in housing 10 extend an appreciable distance below bottom wall 21 of the cup. When a bearing assembly embodying the principles of the present invention has been in use over a period of time, and it becomes necessary to clean the assembly or replace a worn jewel, this may readily be done by inserting a tool through the slots 12 beneath the cup 14 and lifting the cup out of bore 11. If the tool has its opposite edges inclined at a slight angle to the horizontal, the continued introduction of the tool into the slots will gradually force the cup out of the bore. Removal of the old bearing unit will permit the insertion of a new unit, after which the bearing assembly is again ready for use.

While a preferred embodiment of the invention has been illustrated and described by way of example, it will be obvious that changes may be made therein within the spirit and scope of the invention, and, therefore, the invention is not to be limited to the form herein disclosed, except in so far as it may be so limited in the appended claims.

I claim:

1. A bearing assembly of the class described comprising a housing having a bore therein, said bore being open at its outer end and closed at its inner end, a cup disposed in the upper end of said bore and having a height less than the length of said bore, and a bearing element disposed in and carried by said cup, said housing having a lateral opening into the bore at a point below said cup through which a tool may be inserted laterally to remove said cup with its bearing element from said housing.

2. The combination with a screw having one end reduced in diameter, said reduced portion of said screw having a bore extending for substantially the full length thereof and forming a housing, said housing having slots formed therein and communicating with said bore for substantially the full length thereof, of means insertable into said housing as a unit comprising a cup having a height less than the length of said bore, a bearing element disposed in said cup, and means associated with said bearing element and cup to confine said element therein, said slots permitting said housing to exert a clamping action upon said first named means, and in addition permitting the lateral insertion of a tool therethrough into said bore below said cup to remove said means from said housing as a unit.

3. A bearing assembly of the class described comprising a housing having a bore extending inwardly from one end thereof, a cup insertable into said bore and having a height less than the length of said bore, a bearing element carried by and confined within said cup, and means carried by said cup and cooperating with said housing for positioning said cup adjacent the open end of said bore, whereby said bore will extend below said cup, said housing having a lateral opening therein positioned to communicate with the portion of the bore below said cup to thereby permit the lateral introduction of a tool into said bore below said cup to remove said cup therefrom, said lateral opening constituting the sole method of ingress to said bore when said cup is in place therein.

4. A bearing assembly of the class described comprising a housing having a bore extending inwardly from one end thereof, a cup insertable into said bore and having a height less than the length of said bore, a bearing element carried by and confined within said cup, and an outwardly extending member formed on the open marginal edge of said cup, said member being adapted to seat on the open marginal edge of said housing and position the cup adjacent the open end thereof, whereby said bore will extend below said cup, said housing having a lateral opening therein positioned to communicate with the portion of the bore below said cup to thereby permit the lateral introduction of a tool into said bore below said cup to remove said cup therefrom, said lateral opening constituting the sole method of ingress to said bore when said cup is in place therein.

5. A bearing assembly of the class described comprising a member having a bore extending inwardly from one end thereof and forming a housing, a cup insertable into said bore and having a height less than the length of said bore, said member having a plurality of slots opening into the bore therein and extending to a point below said cup, a bearing element carried by said cup, and means securing said bearing element within said cup, said slots in said member permitting said member to be spread slightly to receive the cup in said bore and to exert a clamping action thereon, and to permit the lateral introduction of a tool into said bore below said cup to remove said cup therefrom.

6. In a device of the class described, the combination with a housing having an axial bore, of a bearing assembly insertable into said bore as a unit comprising a cup open at its upper end and provided with a bottom wall, a jewel insertable into said cup and seating by gravity on said bottom wall, said jewel being loosely received within said cup and having its bearing surface disposed to face the open end thereof, and a retaining member insertable into said cup and disposed between the open end thereof and said jewel, said retaining member and said jewel having cooperating surfaces formed thereon and operable upon insertion of said member into said cup to shift said jewel laterally of said cup and thereby automatically center said jewel with respect to the longitudinal axis of said cup and housing, said member thereafter maintaining said jewel against movement in any direction with respect to said cup.

FREDERICK C. HOLTZ.